(12) United States Patent
Jones et al.

(10) Patent No.: US 8,527,744 B2
(45) Date of Patent: Sep. 3, 2013

(54) BOARD MODULE FOR PROVIDING ALTERNATIVE BOARD FUNCTIONS WHICH ARE NOT CALLED BY UEFI COMPATIBLE PROGRAMS FOR DRIVING PLATFORM SERVICE IN SILICON COMPONENTS

(75) Inventors: Stephen E. Jones, Bellevue, WA (US); Eugene Khoruzhenko, Redmond, WA (US); James Mortensen, Lynnwood, WA (US)

(73) Assignee: Kinglite Holdings Inc., Singapore (SG)

( * ) Notice: Subject to any disclaimer, the term of this patent is extended or adjusted under 35 U.S.C. 154(b) by 515 days.

(21) Appl. No.: 12/756,461

(22) Filed: Apr. 8, 2010

(65) Prior Publication Data

US 2010/0318779 A1    Dec. 16, 2010

Related U.S. Application Data

(60) Provisional application No. 61/268,562, filed on Jun. 13, 2009.

(51) Int. Cl.
*G06F 15/177* (2006.01)
*G06F 21/00* (2006.01)
*G06F 13/14* (2006.01)

(52) U.S. Cl.
USPC .................................................. 713/1; 713/2

(58) Field of Classification Search
USPC ...................... 713/1; 717/163, 107; 718/107, 718/108
See application file for complete search history.

(56) References Cited

U.S. PATENT DOCUMENTS

| | | | |
|---|---|---|---|
| 6,732,264 B1 * | 5/2004 | Sun et al. ......................... | 713/2 |
| 7,237,102 B2 | 6/2007 | Rothman | |
| 7,698,547 B1 * | 4/2010 | Polyudov ......................... | 713/2 |
| 2006/0256366 A1 * | 11/2006 | Ferlitsch ....................... | 358/1.15 |
| 2008/0155247 A1 * | 6/2008 | Zimmer et al. .................... | 713/2 |
| 2008/0162919 A1 * | 7/2008 | Zimmer et al. .................... | 713/2 |
| 2008/0244257 A1 * | 10/2008 | Vaid et al. ......................... | 713/2 |
| 2009/0119748 A1 * | 5/2009 | Yao et al. ......................... | 726/2 |
| 2009/0249053 A1 * | 10/2009 | Zimmer et al. .................... | 713/2 |
| 2009/0319763 A1 * | 12/2009 | Zimmer et al. .................... | 713/1 |
| 2009/0327741 A1 * | 12/2009 | Zimmer et al. ............... | 713/183 |
| 2010/0169633 A1 * | 7/2010 | Zimmer et al. .................... | 713/2 |
| 2010/0169949 A1 * | 7/2010 | Rothman et al. .................. | 726/1 |
| 2010/0180051 A1 * | 7/2010 | Harris ............................. | 710/14 |

(Continued)

OTHER PUBLICATIONS

Ruth Li, UEFI Development Training, published by UEFI Plugfet 2007, pp. 1-40.*

(Continued)

*Primary Examiner* — Thomas Lee
*Assistant Examiner* — Aurel Prifti
(74) *Attorney, Agent, or Firm* — Lowe Hauptman & Ham, LLP (57) ABSTRACT

Methods, systems and program products provide platform customization in building of Unified Extensible Firmware Interface based Personal Computer firmware, typically but not essentially as BIOS. Provision is made for a conceptual matrix of Board module, Silicon (or chipset) modules together with core and foundation modules; this supersedes prior approaches that are often based on hierarchical (or inverse hierarchy) structured source codes. A Platform module resides architecturally between Silicon and Board modules. By largely removing the Platform module found in previously developed solutions and introducing a Board module OEM, customizations are separated from actual platform code (and also from core functions). This allows the customization footprint to be much smaller thus easing the programming efforts of porting products to reflect hardware development.

10 Claims, 6 Drawing Sheets

(56) References Cited

U.S. PATENT DOCUMENTS

| | | | |
|---|---|---|---|
| 2010/0318776 A1* | 12/2010 | Jones | 713/1 |
| 2010/0318777 A1* | 12/2010 | Jones | 713/1 |
| 2010/0318778 A1* | 12/2010 | Jones | 713/1 |
| 2010/0318779 A1* | 12/2010 | Jones et al. | 713/1 |
| 2010/0318961 A1* | 12/2010 | Khoruzhenko et al. | 717/107 |
| 2010/0319000 A1* | 12/2010 | Jones | 718/108 |
| 2010/0319001 A1* | 12/2010 | Jones | 718/108 |
| 2012/0254831 A1* | 10/2012 | Mortensen | 717/107 |
| 2012/0266148 A1* | 10/2012 | Mortensen | 717/163 |

OTHER PUBLICATIONS

Paul Dubios, Software Portability with imake, Published by O'Reilly & Associates, Inc. 19993, ISBN 1-56592-055-4, pp. 8-12.*

Tim Lewis & Nill Ge, Phoenix PSI SDK/DDK Overview, Published Mar. 16, 2007, pp. 1-24.*

Tim Lewis, UEFI Overview, Published Jun. 6, 2007, pp. 1-21.*

* cited by examiner

```
//
// FILENAME.
//    MODULE.DEF - SCT 2.0 Module Definition File for Montevina CRB Board.
//
// FUNCTIONAL DESCRIPTION.
//    This module definition file contains the board level configuration
//    for a Phoenix SecureCore (tm) Tiano 2.0 adaptation.
//
//    This SCT 2.0 board module supports the Montevina Customer Reference //    board with the Intel Core 2 Duo processor and Mobile Intel GM45
//    Express chipset.
//
// MODIFICATION HISTORY.
//    09/05/28.    #1.0, original.
//
//
//

//
// Use the Montevina Platform Module to utilize most of the functionality of
// the Montevina Platform. Any settings that distinguish this board from the
// reference platform are overridden in this file.
//

MODULE MontevinaPlatform, 000  // use MontevinaPlatform module.
```

FIG.3

```
//
// FILENAME.
//     PROJECT.DEF - SCT 2.0 Project File for Intel Montevina CRB.
//
// FUNCTIONAL DESCRIPTION.
//    This project file contains the standard default configuration for a
//    Phoenix SecureCore (tm) Tiano 2.0 adaptation.
//
//    This SCT 2.0 adaptation supports the Intel Montevina board with the
//    Intel Core 2 Duo processor and Mobile Intel GM45 Express chipset. The
//    Montevina board is a development board for high performance, low
//    power mobile platforms.
//
// MODIFICATION HISTORY.
//    09/04/15.    #1.0, original.
//
//

//
// Platform Modules, Licenses, and Packages.
//
// The following describes platform specific modules, license information,
// packages, and SIO modules.
//

MODULE Build,        000, BUILD      // location of the MAKEFILE.

MODULE Kernel,       000             // use Kernel module.
MODULE Exec,         000             // use Executive module.
MODULE System,       001             // use System module.

MODULE Foundation,   000             // use Intel Foundation module.

MODULE Pentium,      000, CPU        // use Pentium CPU module.
MODULE Cantiga,      000, NB         // use Cantiga Chipset module.
MODULE ICH9,         000, SB         // use ICH9 South Bridge module.
MODULE SSTLIB,       000             // use SST supporting lib.
MDULE 25VF016B,      000             // use SST25vf016B Flash Part.

MODULE SIO1007,      000             // use SMSC SIO100 super I/O module.
MODULE IntelLib,     000, INTELLIB   // use Intel library module.
```

BOARD MODULE FOR PROVIDING ALTERNATIVE BOARD FUNCTIONS WHICH ARE NOT CALLED BY UEFI COMPATIBLE PROGRAMS FOR DRIVING PLATFORM SERVICE IN SILICON COMPONENTS

RELATED APPLICATIONS

This application claims priority to U.S. Provisional application for a patent No. 61/268,562 entitled INNOVATIONS IN SECURECORE TIANO 2.0 filed Jun. 13, 2009 inventor Stephen E. Jones and which is incorporated in its entirety by this reference.

FIELD OF THE INVENTION

The present invention generally relates to personal computers and devices sharing similar architectures and, more particularly, relates to a system and corresponding or related method for parametric driven customization of Unified Extensible Firmware Interface based Personal Computer firmware. Similar processes and entities within comparable computing apparatuses also fall within the general scope of the invention.

BACKGROUND OF THE INVENTION

Modernly, the use of PCs (personal computers), including so-called laptop and notebook computers, is increasingly common and the computers themselves are ever more powerful and complex. Hardware development continues at great rates resulting in families of PCs that share parts and partial configurations yet have evolving capabilities and legion configurations. A persistent problem is the management of needed changes and enhancements to firmwares as new versions of hardware and entirely new hardware subsystems are phased in—while simultaneously avoiding excessive duplication of effort across families of related, but different, computer products. This leads to a need for capabilities above and beyond those found in previously developed source and build management systems.

Firmware development for PCs presents substantially different problems (requiring substantially different solutions) from software development. Previously developed software development solutions either have systems programs to handle routine programming minutiae and/or comprise systems program(s) that can rely on firmware features to largely hide hardware dependencies. Different again is development for embedded firmware—that firmware typically supports only a very few hardware configurations and/or versions, as contrasted with the very many of each found in PC firmware.

Intel Corporation first defined EFI (Extensible Firmware Interface) as the programming interface exposed by firmware to O/S (operating system); former comparable firmwares were not sufficiently portable nor scalable to Intel's CPU (Central Processor Unit) IA64 (Intel Architecture for 64 bit widths) architecture. A first implementation of the EFI interface became known as Tiano, which Intel Corporation offered under license via a web site. The UEFI (Unified EFI) Forum, a trade group, secured architectural control over derivatives of EFI under a new name—UEFI, with a right to support and extend. The UEFI Forum specifies and documents the UEFI interface itself.

The PIWG (Platform Initialization Working Group) of the UEFI Forum provides a common internal framework for Silicon and platform drivers, so that a common understanding of the roles and methods used by Silicon and platform drivers is developed by implementers of UEFI firmware stacks together with the providers of the Silicon and platform drivers. Silicon and platform drivers are each well-known in the PC firmware arts.

The UEFI and related standards provide richness, but fail to sufficiently address significant specific areas of concern including at least:
  Quality of board bring-up user experience
  Quality of BIOS (Basic Input-Output System) customization experience
  Duration of system bootloading and platform initialization time
  Level of reliability
  Level of compatibility with Intel's Foundation Core (also known as Foundation for short and a discrete part of Tiano)
  Scope for platform innovation by BIOS vendors and partners and customers thereof.

These attributes are described in a version of SCT (SecureCore-Tiano™) System Overview document published by Phoenix® Technologies Ltd. (herein "Phoenix"). Adequately addressing all of these areas of concern requires innovation above and beyond what is described in UEFI and PIWG standards and related documents.

In restructuring the build mechanism with corresponding source programs and databases, opportunities arise to remedy shortcomings in the previously developed solution (known as EDK1). One such problem is the large amount of effort required to perform so-called customization of UEFI builds to suit the requirements of OEMs (Original Equipment Manufacturers) and others. Customization is a term of art in the UEFI build arts and refers, inter alia, to the adapting of a firmware product from a first computer design to a related or derived design. This is typically from a CRB (Customer Reference Board) produced by a SV (Silicon Vendor) and to a board laid out by the OEM and which may incorporate hardware changes that are substantial in scope, but nonetheless relatively limited in variety. This might include hardware port configuration and connect to external electronic devices. It might also include memory of differing operational modes, types, sizes, performance, operating parameters and so on as compared with that on the CRB. Input-Output routing, IRQ (interrupt request) and APIC (Advanced programmable interrupt controller) routing may be selected to suit local desires. Moreover entirely different Silicon (complex semiconductors) may apply, for example a Southbridge chip different from that on the CRB may be selected, such as for reasons of evolving availability, performance and/or cost.

In order to address these issues the structure, both build-time and run-time, of the UEFI components (typically modules) has been reworked in a novel and advantageous configuration. The improvements are as described below.

A significant advantage of embodiments of the invention over previously developed solutions is that the effort of the customization process for multiple types of chipsets (also Silicon), platforms (also product families), hardware levels (especially improved, significantly revised and novel subsystems), and firmware revision levels (especially levels of deficiency and fault remedies) is significantly reduced. And in consequence a plurality of more consistent and higher quality UEFI based distributed products emerge.

SUMMARY OF THE INVENTION

The present invention provides a method for packaging, compiling, linking, and merging programs that embodies the invention. In addition program products and other means for exploiting the invention are presented.

According to an aspect of the present invention an embodiment of the invention may provide a recording medium containing a representation of a firmware formed by a build process having various inputs including:

a plurality of UEFI (Unified Extensible Firmware Interface) compatible programs for driving silicon components; a plurality of UEFI compatible programs for providing platform services to a plurality of programs selected from the programs for driving silicon components; at least one program for providing a board library function to a plurality of programs selected from the programs for providing platform services and a board module for providing alternate board functions that supersede services comprised within the board library function;

According to a further aspect of the invention a method for building a firmware component to execute a sequence of instructions in a device comprising a computer includes:

linking a plurality of UEFI (Unified Extensible Firmware Interface) compatible programs for driving silicon components into the firmware component; linking a plurality of UEFI compatible programs for providing platform services to a plurality of programs selected from the programs for driving silicon components into the firmware component; linking at least one program for providing a board library function to a plurality of programs selected from the programs for providing platform services into the firmware component and linking a board module for providing alternate board functions that supersede services comprised within the a board library function into the firmware component.

Program products and programs transmitted by Internet and similar means that provide for the method are also disclosed.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

DETAILED DESCRIPTION OF THE INVENTION

The numerous components shown in the drawings are presented to provide a person of ordinary skill in the art a thorough, enabling disclosure of the present invention. The description of well-known components is not included within this description so as not to obscure the disclosure or take away or otherwise reduce the novelty of the present invention and the main benefits provided thereby.

Embodiments of the disclosure presented herein provide methods, systems, and computer-readable media for providing and utilizing a means for packaging, compiling, linking, and merging programs that embodies the invention. In addition program products and other means for exploiting the invention are presented.

Figure 1:
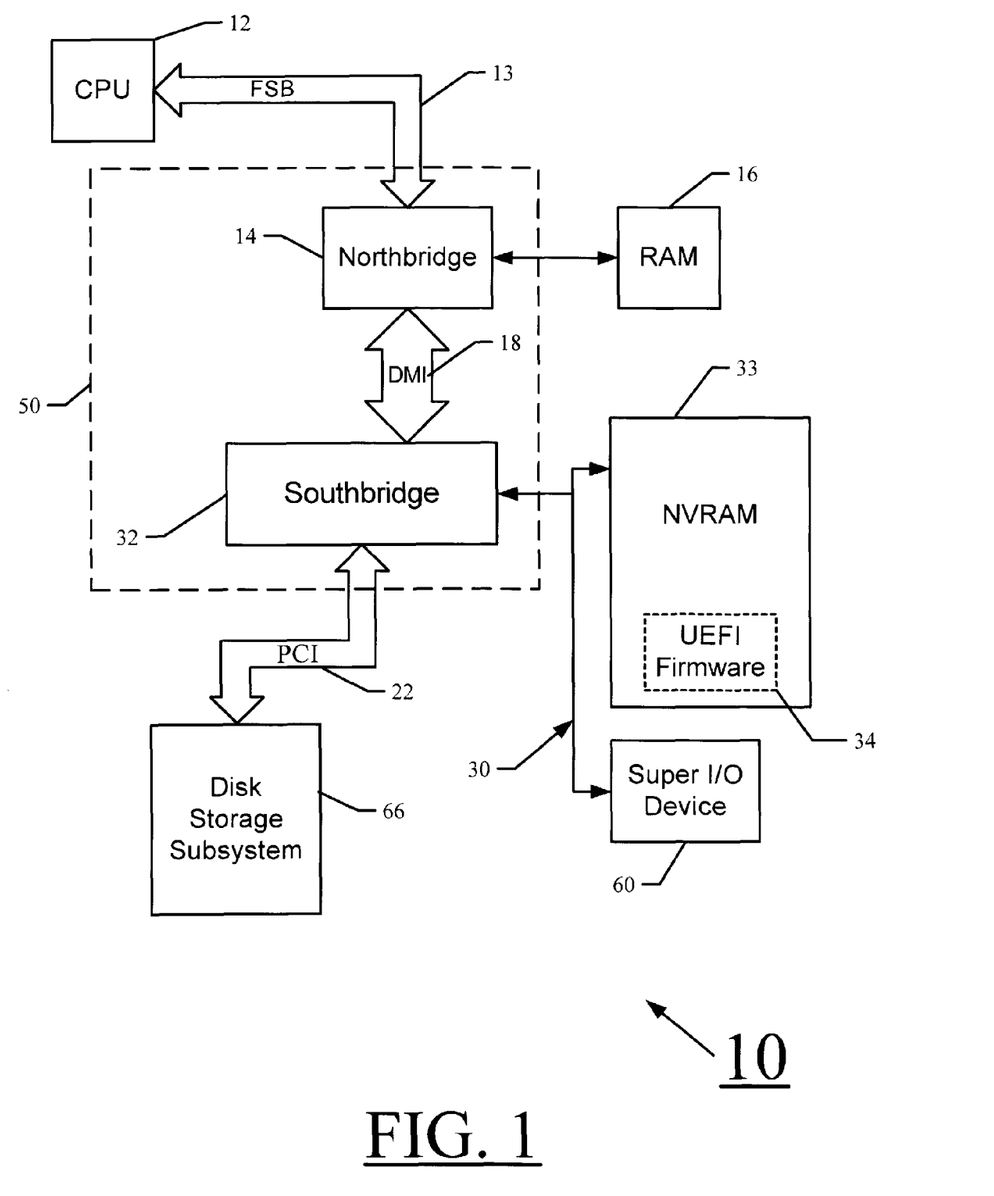
FIG. 1 is a schematic block diagram of an electronic device configured as a target device into which firmware generated using the present invention may be loaded and utilized.

Referring now to the drawings, in which like numerals represent like elements throughout the several figures, aspects of an exemplary operating environment and the implementations provided herein will be described. FIG. 1 is a schematic block diagram of an electronic device configured to implement the firmware target system operational functionality according to the present invention.

FIG. 1 is a schematic block diagram of an electronic device configured as a target device into which firmware generated using the present invention may be loaded and utilized. FIG. 1 shows a computer 10 that is operative to provide an EFI/UEFI firmware environment to provide a DXE (Driver Execution Environment) phase and/or a BDS (Boot Device Selection) phase. DXE and BDS are well known in the UEFI arts. The computer 10 typically includes a baseboard (not shown in FIG. 1), or motherboard form of printed circuit board to which a multitude of components or devices are connected by way of a system bus or other electrical communication path. In one illustrative embodiment, a CPU (central processing unit) 12 operates in conjunction with a chipset 50. The CPU 12 is a standard central processor that performs, inter alia, arithmetic and logical operations necessary for the operation of the computer.

Chipset 50 may include a Northbridge 14 and a Southbridge 32. The Northbridge 14 may be attached to CPU 12 by a FSB (Front Side Bus) 13 and typically provides an interface between the CPU 12 and the remainder of the computer 10. The Northbridge 14 may also provide an interface to a RAM (random access memory) 16 the main memory for the computer 10 and, possibly, to other devices such as an on-board graphics adapter (not shown in FIG. 1).

The Northbridge 14 is connected to a Southbridge 32 by a DMI (direct media interface) 18. The Southbridge 32 may be responsible for controlling many of the input/output functions of the computer 10 such as USB (universal serial bus), sound adapters, Ethernet controllers and one or more GPIO (general purpose input/output) port (None shown in FIG. 1). In one embodiment, a bus comprises a PCI (peripheral component interconnect) bus circuit 22 to which a disk storage subsystem 66 (often abbreviated to "disk") or other storage devices for storing an operating system and application programs may be attached.

The Southbridge 32 may also provide SMM (system management mode) circuits and power management circuitry. A peripheral interface 30 may also be provided by the Southbridge 32 for connecting a SuperI/O (Super input-output) device 60. Southbridge 32 may also incorporate a timer circuit for generating timer circuit interrupts typically at periodic intervals.

As known to those skilled in the art, an O/S (operating system) such as may be stored on disk 66 comprises a set of programs that control operations of a computer and allocation of resources. An application program is software that runs on top of (is loaded and directed by) the O/S software and uses computer resources made available through the O/S to perform application specific tasks desired by a user of the computer 10.

Disk 66 may also provide non-volatile storage for the computer 10. Although the description of computer-readable media contained herein refers to a mass storage device, such as a hard disk or CD-ROM (Compact-Disc-ROM) drive, it should be appreciated by those skilled in the art that computer-readable media can be any available media that can be accessed by the computer 10. By way of example, and not limitation, computer-readable media may comprise computer storage media and communication media. Computer storage media includes volatile and non-volatile, removable and non-removable media implemented in a method or technology for storage of information such as computer-readable instructions, data structures, program modules or other data. Computer storage media includes, but is not limited to, RAM, ROM, EPROM (Erasable, programmable ROM), EEPROM (Electrically EPROM), serial EEPROM, Flash memory or other solid state memory technology, CD-ROM, DVD (Digital Versatile Disk), or other optical storage, magnetic cassettes, magnetic tape, magnetic disk storage or other magnetic storage devices well-known in the art, or any other medium which can be used to store the desired information and which can be accessed by the computer.

The peripheral interface 30 may also connect a computer storage media such as a ROM (not shown) or, more typically, a flash memory such as a NVRAM (non-volatile random access semiconductor memory) 33 for storing UEFI platform firmware 34 that includes program code containing the basic routines that help to start up the computer 10 and to transfer information between elements within the computer 10. The UEFI firmware 34 is compatible with the UEFI Specification.

It should be appreciated that the computer 10 may comprise other types of computing devices, including hand-held computers, embedded computer systems, personal digital assistants, and other types of computing devices known to those skilled in the art. It is also contemplated that the computer 10 may not include all of the components shown in FIG. 1, may include other components that are not explicitly shown in FIG. 1, or may utilize an architecture different from that shown in FIG. 1.

Customization is a part of BIOS development wherein an ODM (original device manufacturer) or OEM (original equipment manufacturer) (either may be herein known as customer for short) adapts a BIOS for a particular customer's platform. Customization provides the unique policies and behaviors required by the customer to make the system achieve its design aims in the marketplace, manufacturable, and (wholly or partly) compatible with other customer systems.

Specific DXE (driver execution environment) interface protocols and PPIs (Pre-extensible firmware interface module to pre-extensible firmware interface module interfaces), such as are required of the platform module by silicon components, change between silicon vendors and also between software supplied by silicon vendors for differencing silicon components. This holds true even for silicon devices that are disparate species of a shared genus. Customization at the DXE protocol and PPI layers require expert knowledge of the specific third-party software components for each hardware device or functional component. Furthermore, knowledge of third-party component protocol and PPI interfaces is not typically transferrable to any other third-party component, even from the same silicon vendor.

The exemplary embodiment of the invention provides a strongly architected method for customization that is independent of silicon specific protocols and PPIs. The files that implement this method are separated from the previously developed platform components that satisfy the silicon requirements. In many cases customization may thus be isolated to a single directory with a minimal number of files. This allows board-level customization through editing of a relatively small collection of files that contain only well documented and strongly architected interface functions and which are independent of silicon vendors and third-party hardware initialization components alike.

Figure 2:
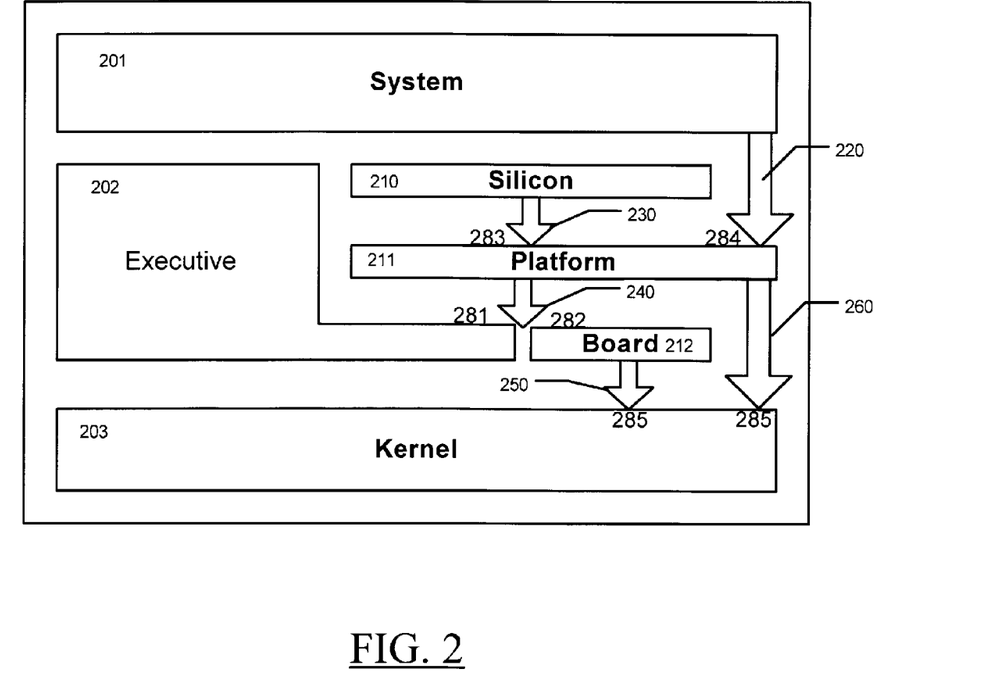
FIG. 2 illustrates platform customization interfaces between Kernel, Platform, and Board modules according to an embodiment of the invention.

FIG. 2 illustrates platform customization interfaces between Kernel, Platform, and Board modules according to an embodiment of the invention.

Silicon modules are provided by silicon vendors to initialize specific silicon hardware components. These modules are substantially unarchitected, and may require any number of DXE Protocols and PPIs that may utilize any convenient structure. The Platform module publishes all the DXE Protocols and PPIs that are required by hardware-specific Silicon modules. Because this interface is unarchitected, the list of specific DXE Protocols and PPIs will be different across differing Platform families (for example CRBs—customer reference boards). In addition, the Platform module also publishes DXE Protocols and PPIs as may be required by Core components.

A single implemented Platform module may thus be used to support a great number of boards whose design is based on particular Platform family. The Platform module is typically written to provide all functionality available for a particular Platform family, and conform to a specified default behavior. The default behavior may be controlled to some extent by build-time configuration parameters, run-time configuration parameters, and by run-time call outs to the Board module itself.

Configuration parameters are managed by the Kernel's Configuration Manager (CM), and the Platform is written to build some code paths based on build-time configuration values (in one embodiment OPTION_SUPPORT_AHCI is used), and to run certain code paths based on run-time configuration values made available through the CM API (application programming interface).

In addition, the Platform queries the Board module prior to performing certain default initialization paths. This allows the Board module to indicate that it has "claimed" this action, in which case the Platform will skip that step. The Platform will also call the Board module at particular stages to allow it to perform additional Board-design specific work.

Still referring to FIG. 2, this shows the platform customization interfaces between the Kernel, Platform, and Board module. System module 201 may call 220 Platform module using Core protocols and PPIs 284. Platform module may, in turn call 260 down to Kernel 203 CM API 285 (Configuration manager's application programming interface). Kernel 203 CM API 285 may also be called 250 by Board module 212.

More generally, Silicon module 210 may call 230 Platform module 211 using silicon vendor protocols and PPIs 281. Also, Executive 202 may, among its may features, provide hardware policy information to Platform 211 via its Exec Board library functions 283

Platform modules provide the PPIs and protocols needed by families of Silicon modules, but they are typically left unmodified by the OEM customer. Instead, the customer's code calls the strongly-architected Board module, which can be created by the customer and is simpler than the unarchitected Platform modules. The Platform module is created once, for a family of silicon components, and is unmodified by the OEM customer.

The Platform module in SCT provides support for families of SV modules. At their upper edge, the Platform module provides an agreed set PPIs and protocols required by the silicon drivers. It is also responsible for implementing the algorithms required for enabling, disabling, and configuration of Platform family hardware components, whether through SV specific Protocol and PPI calls and return values, or direct manipulation of the hardware.

The platform provides a set of configuration manager parameters as default policies in a respective MODULE.DEF file to indicate hardware-specific functionality associated with a particular Platform family. These values may be overridden by Board and Project level definitions in the MODULE.DEF and PROJECT.DEF files, respectively.

At their lower edge, Platform modules call 240 the Board module through the strongly-architected BoardLib interface 282. This interface is used to query policy questions, provide an opportunity to perform Board design specific algorithms, and perform additional board specific work at particular stages of platform initialization.

The Executive core component provides the default set of methods that define the interface between the Platform and Board modules. The default methods return values indicating to "do the default action" or "no work to be performed". This set of methods builds to a library, called ExecBoardLib. This library is included by the project DSC file after the board-level overrides so these default methods are available and will be called for all references to methods not defined by the Board.

The Board modules provide the centralized location for OEM-written code that implements customization policies. From a packaging point of view, Board modules may consist of C source files containing implementations of functions written by the OEM matching a specification for the Board module API.

Physically the OEM's Board module is compiled into a library that supplies the functions called by the Platform module. Board is responsible for implementing functions that override the default methods provided by ExecBoardLib to account for hardware related differences between the Platform family and the specific board design. This set of override methods builds to a library, called BoardLib. This library is included by the project DSC file before the ExecBoardLib.

The Board module contains a respective module definition configuration file (MODULE.DEF). This file serves multiple purposes. One purpose is to specify the Platform family that supports the board module. Another purpose is to provide hardware-related configuration parameter overrides for the defaults provided by the Platform module. These overrides indicate the hardware differences between the original Platform and the Board-specific design.

Figure 3:
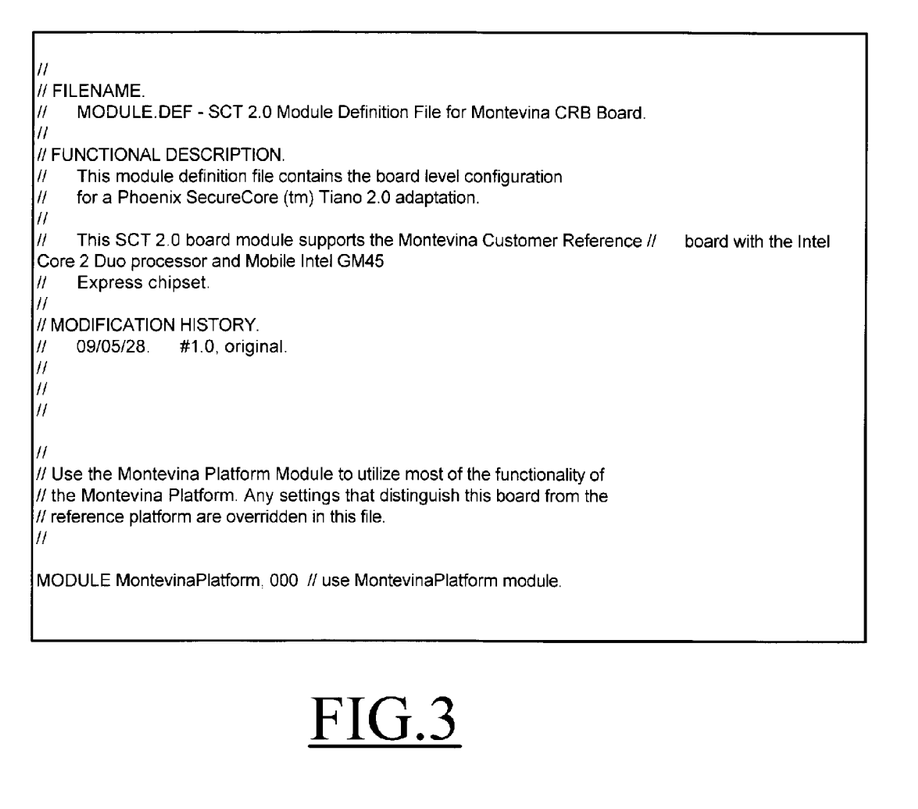
FIG. 3 shows an exemplary Board MODULE.DEF file according to an embodiment of the invention.

FIG. 3 shows an example Board MODULE.DEF file, illustrating that the MontevinaPlatform Platform module provides support for the MontevinaCrb Board module.

The Project Definition file allows for customization of functionality to account for implementation elections. It allows a customer to enable or disable available features (e.g., restrict booting to only specified devices), and modify configurable values (e.g., to set port I/O addresses).

Components of SCT are configurable by the customer at build time, through the use of statements in the Project File. There are several types of statements supported by SCT; additional statements may be defined in future versions. These statements are Module, Option, Config, and Set. Statements defined in the Project File override statements defined anywhere else.

Figure 4:
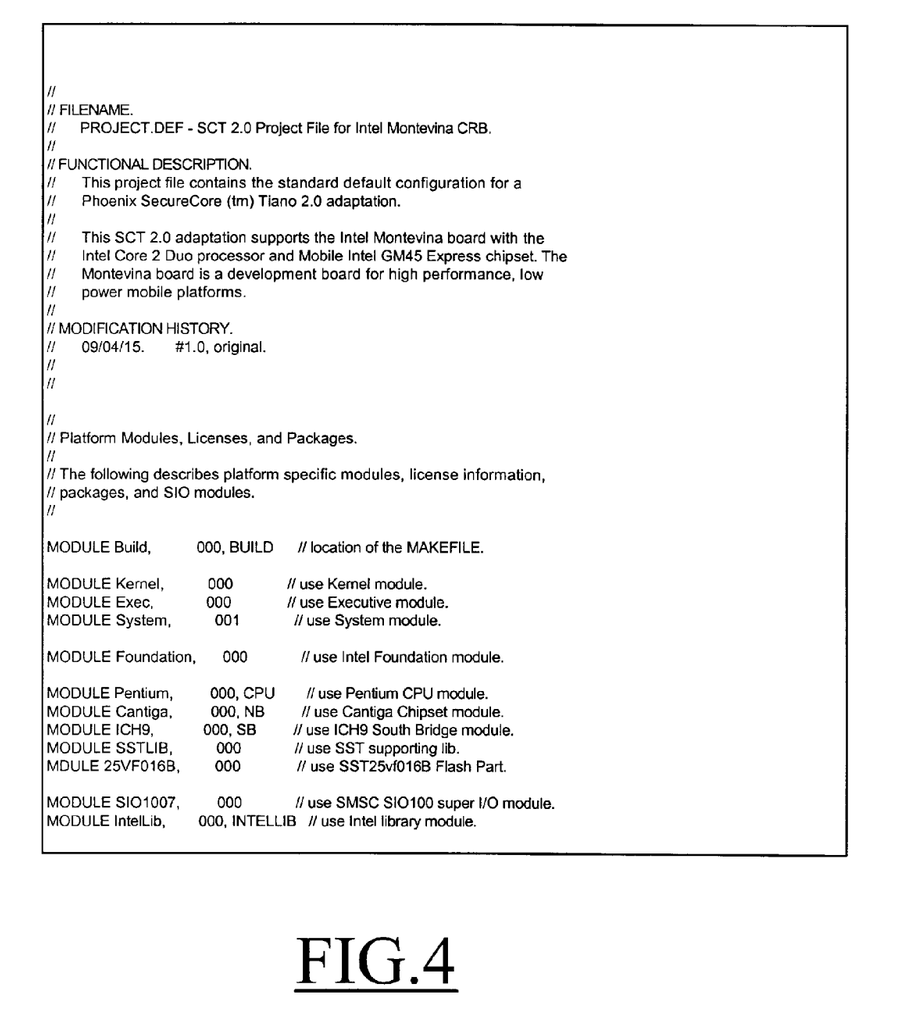
FIG. 4 shows an example Project File for a customer reference board.

FIG. 4 shows an example Project File for the Montevina CRB, illustrating how the Executive layer (that provides the default Board library) and Board module (that both provides the Board-specific board library and defines the Platform module that supports the board, as described above) are selected through the use of Module statements.

Run-time configuration may be managed by the Kernel CM (Configuration Manager). The CM exposes an API that enables Executive, System, and Application clients to scan and read the CM Namespace, defined during the build. A representation of the CM Namespace, which may typically use a property tree, is known as the CM Database when it is located in a file on the Firmware Volume, describes the system's hardware organization and its desired run-time behavior.

Figure 5:
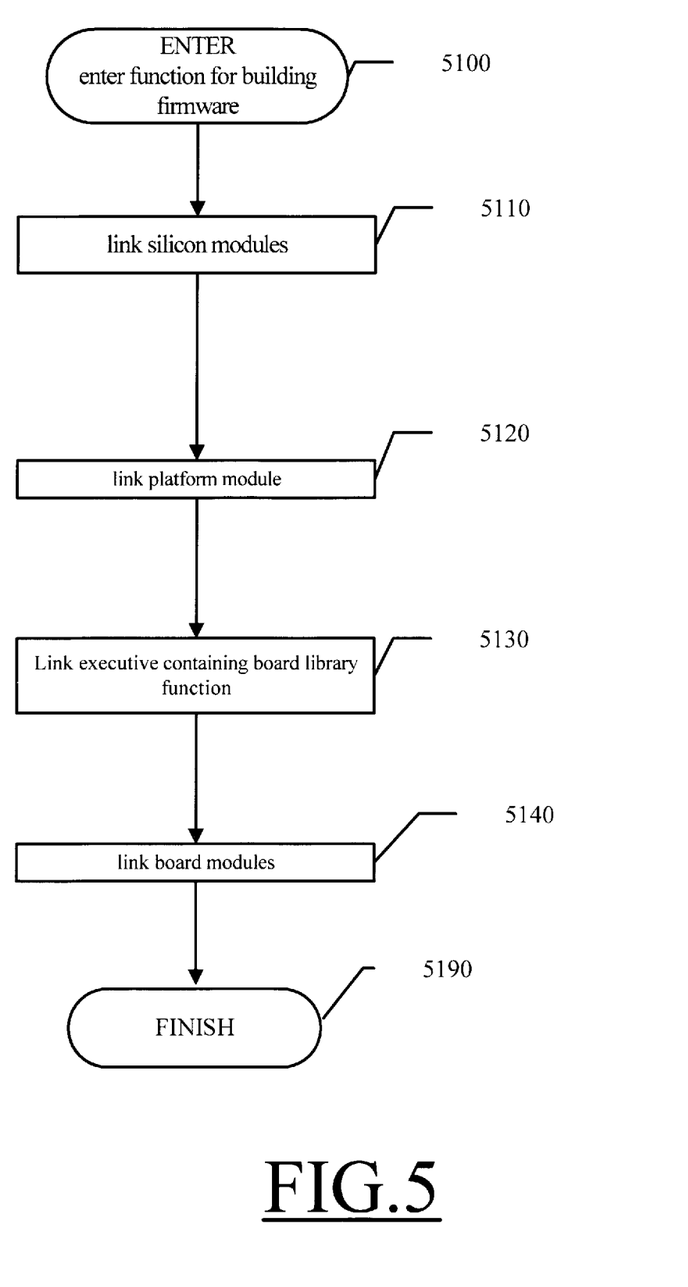
FIG. 5 is a flowchart that shows a method according to an embodiment of the invention that implements the building a firmware component.

FIG. 5 is a flowchart that shows a method according to an embodiment of the invention that implements the building a firmware component to execute a sequence of instructions to implement functions described above. At Ref. 5100 entry is made to a function for building a firmware (or firmware and software) image according to an embodiment of the invention.

At Ref. 5110, a plurality of UEFI (Unified Extensible Firmware Interface) compatible programs for driving silicon components is linked into the firmware component.

At Ref 5120, a plurality of UEFI compatible programs for providing platform services to a plurality of programs selected from the programs for driving silicon components is linked into the firmware component.

At Ref 5130, at least one program for providing a board library function to a plurality of programs selected from the programs for providing platform services is linked into the firmware component At Ref. 5140 a board module for providing alternate board functions that supersede services comprised within the a board library function is linked into the firmware component.

At Ref 5190 the method ends.

Figure 6:
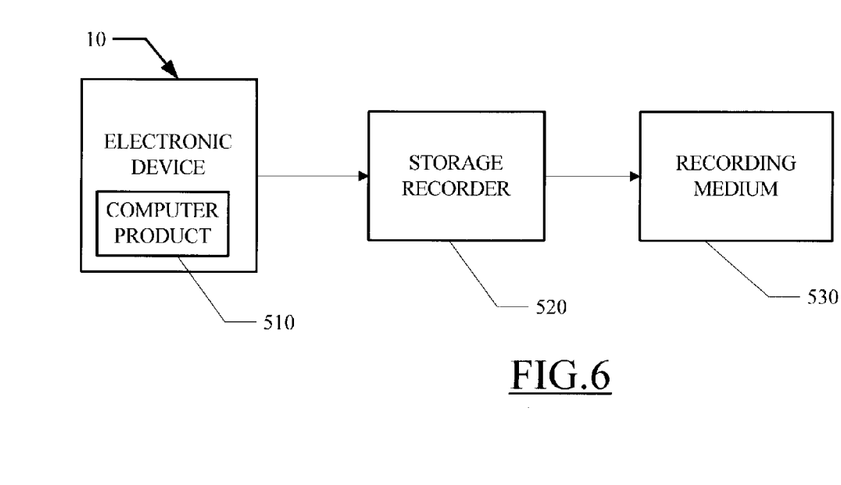
FIG. 6 shows how an exemplary embodiment of the invention may be encoded onto a computer medium or media.

With regards to FIG. 6, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 6 for clarity but more than one medium may be used and a single computer product may be divided among a plurality of media.

Figure 7:
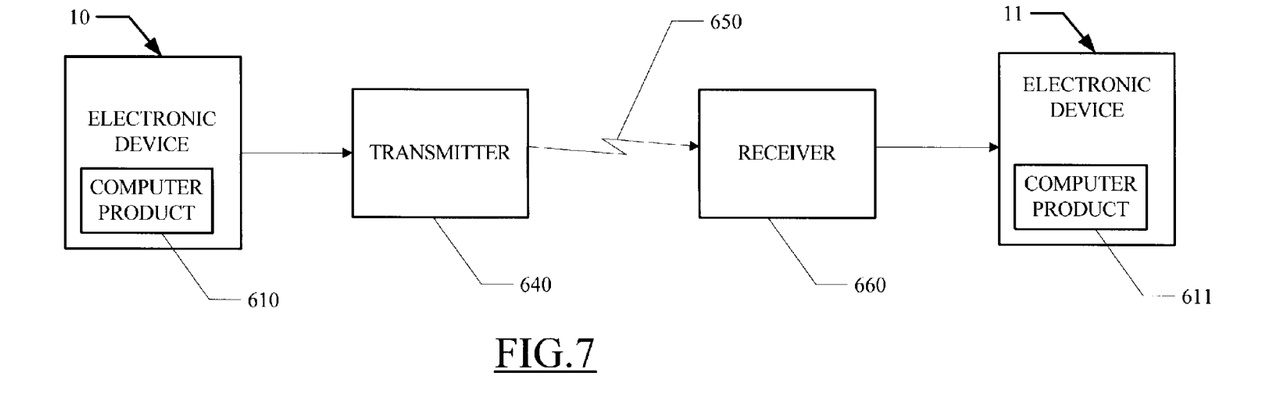
FIG. 7 shows how an exemplary embodiment of the invention may be encoded, transmitted, received and decoded using electro-magnetic waves.

FIG. 7 shows how an exemplary embodiment of the invention may be encoded, transmitted, received and decoded using electro-magnetic waves.

With regard to FIG. 7, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A non-transitory recording medium containing a representation of a firmware formed by a build process having inputs comprising:

a plurality of UEFI (Unified Extensible Firmware Interface) compatible programs for driving silicon components;

a plurality of UEFI compatible programs for providing platform services to a plurality of programs selected from the programs for driving silicon components;

at least one program for providing a board library function to a plurality of programs selected from the UEFI compatible programs for providing platform services; and a board module for providing alternate board functions that supersede services comprised within the board library function, wherein the alternate board functions are provided to said plurality of programs selected from the UEFI compatible programs for providing platform services, and wherein the services comprised within the board library function that are superseded by the alternate board functions are not called by said plurality of programs selected from the UEFI compatible programs for providing platform services.

2. The non-transitory recording medium of claim 1 wherein:

the programs for providing platform services comprises capabilities for exporting a PPI (Pre-extensible firmware interface module to pre-extensible firmware interface module interface) and programs for driving silicon components comprise capabilities for using the PPI.

3. The non-transitory recording medium of claim 2 wherein:

the board library function programs for providing platform services comprise capabilities for exporting a DXE (driver execution environment) interface and programs for driving silicon components comprise capabilities for using the DXE interface.

4. The non-transitory recording medium of claim 1 wherein:

the programs for providing platform services comprise capabilities for exporting a DXE (driver execution environment) interface and programs for driving silicon components comprise capabilities for using the DXE interface.

5. The non-transitory recording medium of claim 1 wherein the inputs further comprise:

a kernel CM (Configuration Manager) for providing runtime configuration data to the programs for providing platform services.

6. A method for building a firmware component to execute a sequence of instructions in a device comprising a computer, the method comprising:

linking a plurality of UEFI (Unified Extensible Firmware Interface) compatible programs for driving silicon components into the firmware component;

linking a plurality of UEFI compatible programs for providing platform services to a plurality of programs selected from the programs for driving silicon components into the firmware component;

linking at least one program for providing a board library function to a plurality of programs selected from the UEFI compatible programs for providing platform services into the firmware components and linking a board module for providing alternate board functions that supersede services comprised within the board library function into the firmware component, wherein the alternate board functions are provided to said plurality of programs selected from the UEFI compatible programs for providing platform services, and wherein the services comprised within the board library function that are superseded by the alternate board functions are not called by said plurality of programs selected from the UEFI compatible programs for providing platform services.

7. The method of claim 6 wherein:

the programs for providing platform services comprise capabilities for exporting a PPI (Pre-extensible firmware interface module to pre-extensible firmware interface module interface) and programs for driving silicon components comprise capabilities for using the PPI.

8. The method of claim 6 wherein:

the programs for providing platform services comprise capabilities for exporting a DXE (driver execution environment) interface and programs for driving silicon components comprise capabilities for using the DXE interface.

9. The method of claim 6 wherein:

the board library function programs for providing platform services comprise capabilities for exporting a DXE (driver execution environment) interface and programs for driving silicon components comprise capabilities for using the DXE interface.

10. The method of claim 6 wherein the inputs further comprise:

a kernel CM (Configuration Manager) for providing runtime configuration data to the programs for providing platform services.

* * * * *